United States Patent
Kazemi et al.

(10) Patent No.: US 11,954,913 B2
(45) Date of Patent: Apr. 9, 2024

(54) SYSTEM AND METHOD FOR VISION-BASED VEHICLE FLUID LEAK DETECTION

(71) Applicant: GM GLOBAL TECHNOLOGY OPERATIONS LLC, Detroit, MI (US)

(72) Inventors: Hamed Kazemi, Scarborough (CA); Hong Wong, Toronto (CA)

(73) Assignee: GM GLOBAL TECHNOLOGY OPERATIONS LLC, Detroit, MI (US)

(*) Notice: Subject to any disclaimer, the term of this patent is extended or adjusted under 35 U.S.C. 154(b) by 0 days.

(21) Appl. No.: 17/816,546

(22) Filed: Aug. 1, 2022

(65) Prior Publication Data
US 2024/0037955 A1   Feb. 1, 2024

(51) Int. Cl.
| | |
|---|---|
| G06V 20/56 | (2022.01) |
| B60Q 9/00 | (2006.01) |
| G06V 10/56 | (2022.01) |
| G06V 10/74 | (2022.01) |
| G06V 10/764 | (2022.01) |
| H04N 23/90 | (2023.01) |

(52) U.S. Cl.
CPC ............ *G06V 20/56* (2022.01); *B60Q 9/00* (2013.01); *G06V 10/56* (2022.01); *G06V 10/74* (2022.01); *G06V 10/764* (2022.01); *H04N 23/90* (2023.01)

(58) Field of Classification Search
CPC ............ G06T 2207/30264; G06T 7/70; G06T 2207/10024; G06T 7/001; G06T 2207/10028; G06T 2207/20021; G06T 2207/20221; G06T 7/187; H04N 7/181; H04N 23/62; H04N 23/66; H04N 23/69; H04N 23/80; H04N 23/90; H04N 7/18; G06F 18/00; G06F 18/22; G06Q 20/02
See application file for complete search history.

(56) References Cited

U.S. PATENT DOCUMENTS

2019/0376869 A1* 12/2019 Dudar .................. G01M 3/16

FOREIGN PATENT DOCUMENTS

CN            115442586 A  * 12/2022

* cited by examiner

Primary Examiner — Masum Billah
(74) Attorney, Agent, or Firm — Lorenz & Kopf LLP

(57) ABSTRACT

Methods and systems are provided that include obtaining first camera images of a parking location before a vehicle is parked at the parking location; obtaining second camera images of the parking location after the vehicle is parked at the parking location; and detecting, via a processor, a fluid leak for the vehicle based on a comparison of the first camera images and the second camera images.

19 Claims, 3 Drawing Sheets

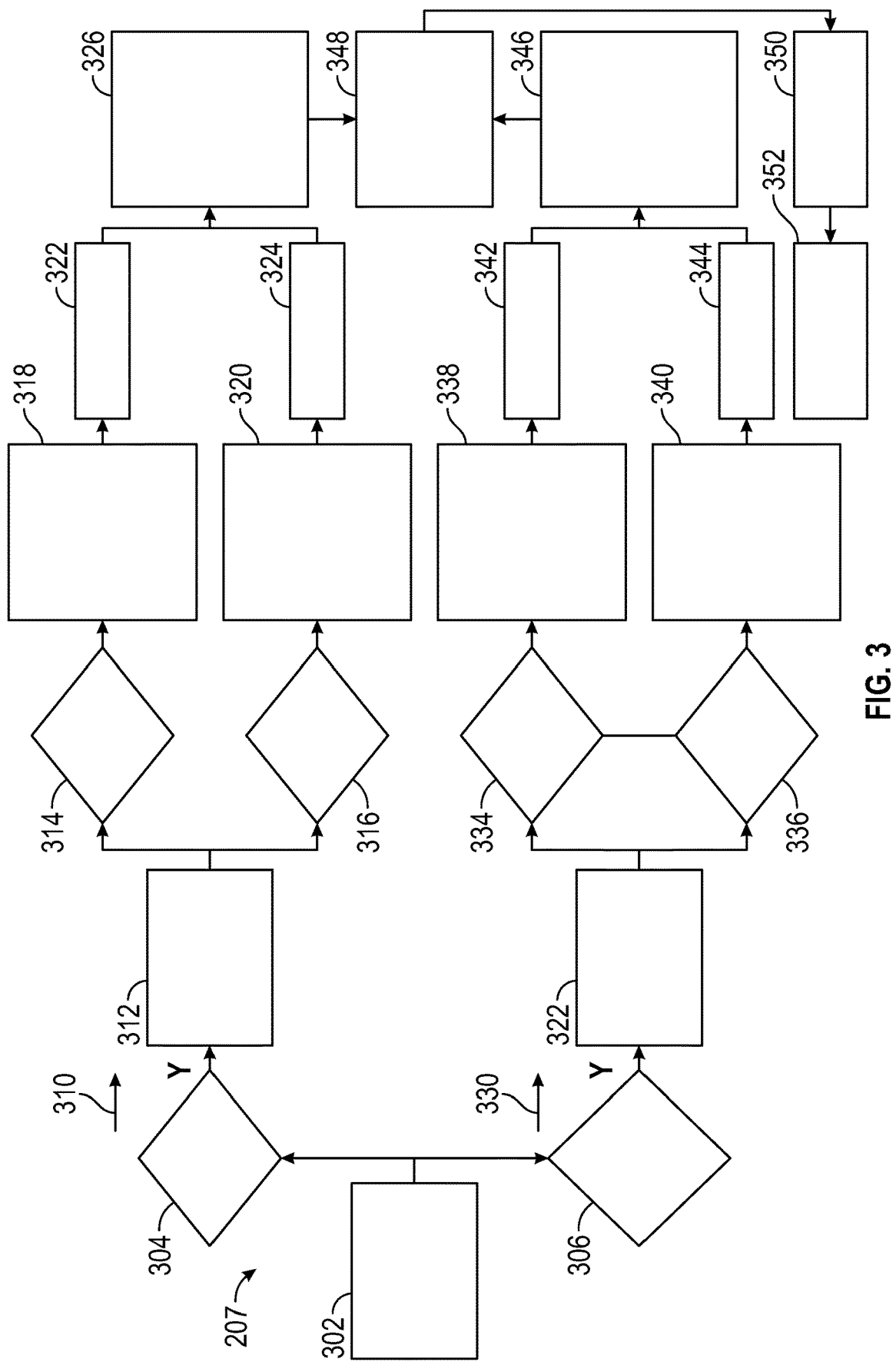

SYSTEM AND METHOD FOR VISION-BASED VEHICLE FLUID LEAK DETECTION

TECHNICAL FIELD

The technical field generally relates to vehicles and, more specifically, to methods and systems for detecting leaks of vehicles.

BACKGROUND

For vehicles today, fluid leaks may be detected by visual inspection, such as by a human service technician. However, this may not always provide optimal timing for detection of fluid leaks for vehicles, for example when a human service technician is not present or when a human driver may not notice the fluid leak in a timely manner.

Accordingly, it is desirable to provide improved methods and systems for detection of fluid leaks for vehicles. Furthermore, other desirable features and characteristics of the present invention will become apparent from the subsequent detailed description of the invention and the appended claims, taken in conjunction with the accompanying drawings and this background of the invention.

SUMMARY

In an exemplary embodiment, a method is provided that includes: obtaining first camera images of a parking location before a vehicle is parked at the parking location; obtaining second camera images of the parking location after the vehicle is parked at the parking location; and detecting, via a processor, a fluid leak for the vehicle based on a comparison of the first camera images and the second camera images.

Also in an exemplary embodiment, the parking location includes a parking spot at which the vehicle is parked for at least a predetermined amount of time.

Also in an exemplary embodiment: the first camera images and the second camera images are obtained via one or more cameras onboard the vehicle; and the fluid leak is detected by the processor, the processor being disposed onboard the vehicle and coupled to the one or more cameras onboard the vehicle.

Also in an exemplary embodiment, the method further includes obtaining sensor data as to a first direction of movement of the vehicle as the vehicle approaches the parking location, and as to a second direction of movement of the vehicle as the vehicle leaves the parking location; wherein the obtaining of the first camera images and the obtaining of the second camera images include activating selected cameras of the one or more cameras onboard the vehicle based on the first direction of movement and the second direction of movement.

Also in an exemplary embodiment, the step of obtaining the first camera images includes: activating one or more front cameras of the vehicle for capturing the first camera images before the vehicle is parked at the parking location, when it is determined that the first direction of movement is forward; and activating one or more rear cameras of the vehicle, instead of the one or more front cameras of the vehicle, for capturing the first camera images before the vehicle is parked at the parking location, when it is determined that the first direction of movement is reverse; and the step of obtaining the second camera images includes: activating the one or more front cameras of the vehicle for capturing the second camera images after the vehicle is parked at the parking location, when it is determined that the second direction of movement is reverse; and activating the one or more rear cameras of the vehicle, instead of the one or more front cameras of the vehicle, for capturing the second camera images after the vehicle is parked at the parking location, when it is determined that the second direction of movement is forward.

Also in an exemplary embodiment, the method further includes determining, via the processor, a classification of the fluid leak, based on a comparison of color differences of fluid detected between the first camera images and the second camera images.

Also in an exemplary embodiment, the method further includes determining, via the processor, a classification of the fluid leak, based on a comparison of differences in a location of fluid detected between the first camera images and the second camera images.

Also in an exemplary embodiment, the method further includes: generating, via instructions provided by the processor, a report with a classification of the fluid leak based on the comparison between the first camera images and the second camera images; and providing, via instructions provided by the processor, the report to a user of the vehicle.

In accordance with another exemplary embodiment, a system is provided that includes one or more sensors configured to obtain sensor data as to a first direction of movement of a vehicle as the vehicle approaches a parking location, and as to a second direction of movement of the vehicle as the vehicle leaves the parking location; and a processor coupled to the one or more sensors and configured to at least facilitate: obtaining first camera images of the parking location before the vehicle is parked at the parking location, by activating one or more first cameras onboard the vehicle based on the first direction of movement; obtaining second camera images of the parking location after the vehicle is parked at the parking location, by activating one or more second cameras onboard the vehicle based on the second direction of movement; and detecting a fluid leak for the vehicle based on a comparison of the first camera images and the second camera images.

Also in an exemplary embodiment, the processor is configured to at least facilitate obtaining the first camera images by: activating one or more front cameras of the vehicle for capturing the first camera images before the vehicle is parked at the parking location, when it is determined that the first direction of movement is forward; and activating one or more rear cameras of the vehicle, instead of the one or more front cameras of the vehicle, for capturing the first camera images before the vehicle is parked at the parking location, when it is determined that the first direction of movement is reverse; and obtaining the second camera images by: activating the one or more front cameras of the vehicle for capturing the second camera images after the vehicle is parked at the parking location, when it is determined that the second direction of movement is reverse; and activating the one or more rear cameras of the vehicle, instead of the one or more front cameras of the vehicle, for capturing the second camera images after the vehicle is parked at the parking location, when it is determined that the second direction of movement is forward.

Also in an exemplary embodiment, the processor is further configured to at least facilitate determining a classification of the fluid leak, based on a comparison of color differences of fluid detected between the first camera images and the second camera images.

Also in an exemplary embodiment, the processor is further configured to at least facilitate determining a classification of the fluid leak, based on a comparison of differences in a location of fluid detected between the first camera images and the second camera images.

Also in an exemplary embodiment, the processor is further configured to at least facilitate: generating a report with a classification of the fluid leak based on the comparison between the first camera images and the second camera images; and providing the report to a user of the vehicle.

In another exemplary embodiment, a vehicle is provided that includes: a body; a propulsion system configured to generate movement of the body; one or more cameras disposed onboard the vehicle and configured to at least facilitate: obtaining first camera images of a parking location before the vehicle is parked at the parking location; and obtaining second camera images of the parking location after the vehicle is parked at the parking location; and a processor that is coupled to the one or more cameras and configured to at least facilitate detecting a fluid leak for the vehicle based on a comparison of the first camera images and the second camera images.

Also in an exemplary embodiment, the parking location includes a parking spot at which the vehicle is parked for at least a predetermined amount of time.

Also in an exemplary embodiment, the vehicle further includes one or more sensors disposed onboard the vehicle and configured to obtain sensor data as to a first direction of movement of the vehicle as the vehicle approaches the parking location, and as to a second direction of movement of the vehicle as the vehicle leaves the parking location; wherein the processor is configured to at least facilitate activating selected cameras of the one or more cameras onboard the vehicle based on the first direction of movement and the second direction of movement.

Also in an exemplary embodiment, the one or more cameras include one or more front cameras of the vehicle and one or more rear cameras of the vehicle; and the processor is further configured to at least facilitate: activating the one or more front cameras of the vehicle for capturing the first camera images before the vehicle is parked at the parking location, when it is determined that the first direction of movement is forward; activating the one or more rear cameras of the vehicle, instead of the one or more front cameras of the vehicle, for capturing the first camera images before the vehicle is parked at the parking location, when it is determined that the first direction of movement is reverse; activating the one or more front cameras of the vehicle for capturing the second camera images after the vehicle is parked at the parking location, when it is determined that the second direction of movement is reverse; and activating the one or more rear cameras of the vehicle, instead of the one or more front cameras of the vehicle, for capturing the second camera images after the vehicle is parked at the parking location, when it is determined that the second direction of movement is forward.

Also in an exemplary embodiment, the processor is further configured to at least facilitate determining a classification of the fluid leak, based on a comparison of color differences of fluid detected between the first camera images and the second camera images.

Also in an exemplary embodiment, the processor is further configured to at least facilitate determining a classification of the fluid leak, based on a comparison of differences in a location of fluid detected between the first camera images and the second camera images.

Also in an exemplary embodiment, the processor is further configured to at least facilitate: generating a report with a classification of the fluid leak based on the comparison between the first camera images and the second camera images; and providing the report to a user of the vehicle.

DESCRIPTION OF THE DRAWINGS

The present disclosure will hereinafter be described in conjunction with the following drawing figures, wherein like numerals denote like elements, and wherein:

FIG. 3 is a flowchart of a sub-process for a series of steps of the process 200 of FIG. an exemplary step of the process of FIG. 2, including the detection and identification of the fluid leak in accordance with the instructions provided by the processor 142, in accordance with exemplary embodiments.

DETAILED DESCRIPTION

The following detailed description is merely exemplary in nature and is not intended to limit the disclosure or the application and uses thereof. Furthermore, there is no intention to be bound by any theory presented in the preceding background or the following detailed description.

Figure 1:
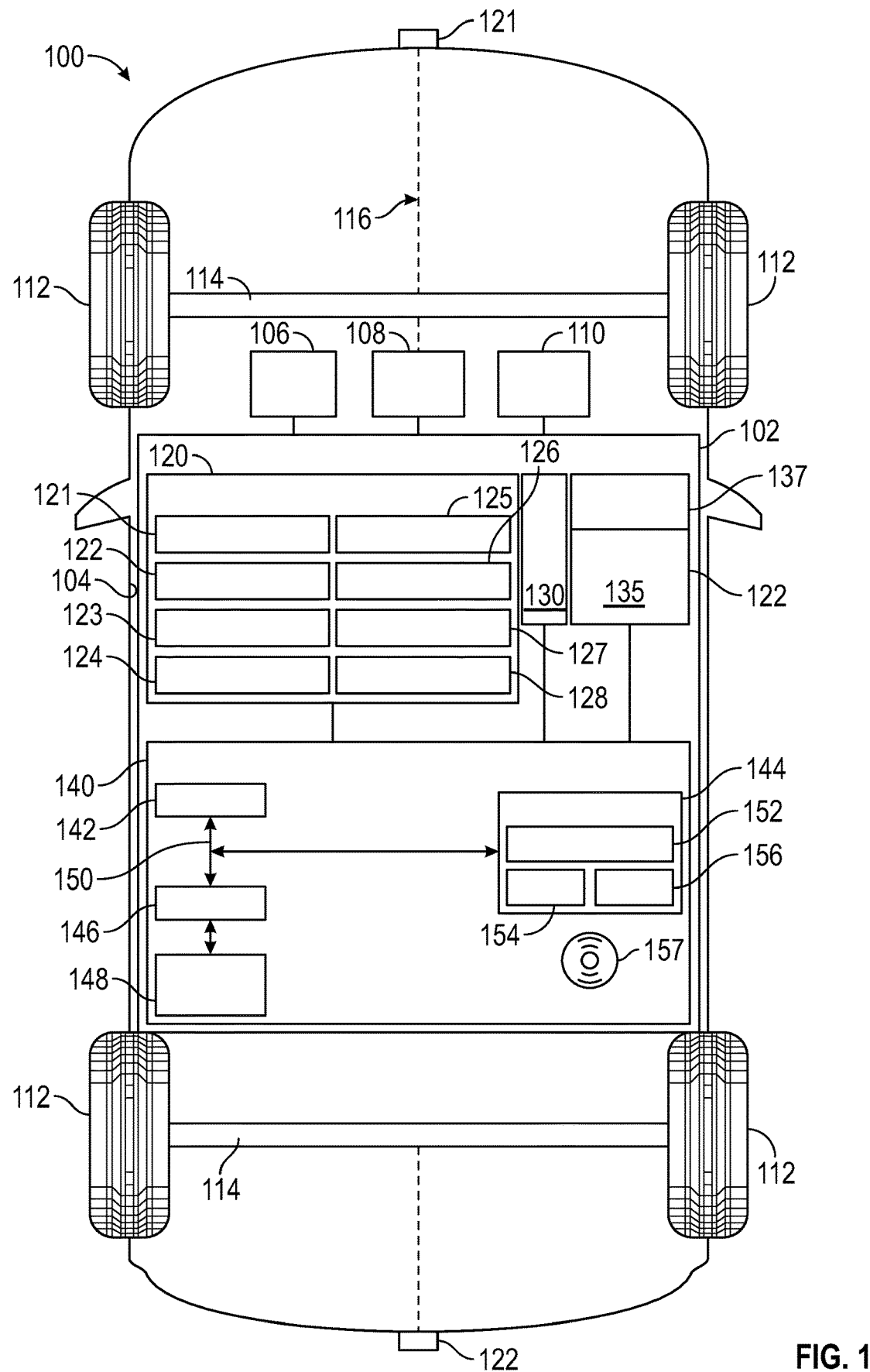
FIG. 1 is a functional block diagram of a vehicle having a control system for detecting fluid leaks of vehicles using vision-based technology, in accordance with exemplary embodiments.

FIG. 1 illustrates a vehicle 100. In various embodiments, and as described further below, the vehicle 100 includes a control system 102 for detecting fluid leaks for the vehicle 100 using vision-based technology and utilizing front cameras 121 and rear cameras 122 of the vehicle 100.

In various embodiments, the vehicle 100 comprises an automobile. The vehicle 100 may be any one of a number of different types of automobiles, such as, for example, a sedan, a wagon, a truck, or a sport utility vehicle (SUV), and may be two-wheel drive (2WD) (i.e., rear-wheel drive or front-wheel drive), four-wheel drive (4WD) or all-wheel drive (AWD), and/or various other types of vehicles in certain embodiments. In certain embodiments, the vehicle 100 may also comprise a motorcycle or other vehicle, such as aircraft, spacecraft, watercraft, and so on, and/or one or more other types of mobile platforms (e.g., a robot and/or other mobile platform).

In certain embodiments, the vehicle 100 may comprise an autonomous or semi-autonomous vehicle, for example in which vehicle control is automatically planned and executed by the control system 102, in whole or in part. In certain other embodiments, the vehicle 100 may be operated by a human driver. In addition, in certain embodiments the vehicle 100 may be part of a fleet of vehicles, such as a fleet of autonomous vehicles or a fleet of vehicles with human drivers.

The vehicle 100 includes a body 104 that is arranged on a chassis 116. The body 104 substantially encloses other components of the vehicle 100. The body 104 and the chassis 116 may jointly form a frame. The vehicle 100 also includes a plurality of wheels 112. The wheels 112 are each rotationally coupled to the chassis 116 near a respective corner of the body 104 to facilitate movement of the vehicle 100. In one embodiment, the vehicle 100 includes four wheels 112, although this may vary in other embodiments (for example for trucks and certain other vehicles).

In various embodiments, a drive system 110 is mounted on the chassis 116, and drives the wheels 112, for example via axles 114. The drive system 110 preferably comprises a propulsion system. In certain exemplary embodiments, the drive system 110 comprises an internal combustion engine and/or an electric motor/generator, coupled with a transmission thereof. In certain embodiments, the drive system 110 may vary, and/or two or more drive systems 110 may be used. By way of example, the vehicle 100 may also incorporate any one of, or combination of, a number of different types of propulsion systems, such as, for example, a gasoline or diesel fueled combustion engine, a "flex fuel vehicle" (FFV) engine (i.e., using a mixture of gasoline and alcohol), a gaseous compound (e.g., hydrogen and/or natural gas) fueled engine, a combustion/electric motor hybrid engine, and an electric motor. In various embodiments, the drive system 110 includes one or more gears (e.g., park, reverse, neutral, and drive) that may be selected by a human driver and/or automatically via the control system 102.

Also as depicted in FIG. 1, in various embodiments the vehicle 100 also includes a braking system 106 and a steering system 108. In exemplary embodiments, the braking system 106 controls braking of the vehicle 100 using braking components that are controlled via inputs provided by a driver (e.g., via a braking pedal in certain embodiments) and/or automatically via the control system 102. Also in exemplary embodiments, the steering system 108 controls steering of the vehicle 100 via steering components (e.g., a steering column coupled to the axles 114 and/or the wheels 112) that are controlled via inputs provided by a driver (e.g., via a steering wheel in certain embodiments) and/or automatically via the control system 102.

As noted above, the control system 102 detects fluid leaks for the vehicle 100 using vision-based technology utilizing front cameras 121 and rear cameras 122 of the vehicle 100, in accordance with exemplary embodiments. In addition, in various embodiments, the control system 102 may control one or more other vehicle systems and/or functionality in whole or in part, such as the drive system 110, the braking system 106, the steering system 108, and so on.

In the embodiment depicted in FIG. 1, the control system 102 includes a sensor array 120, a location system 130, a transceiver 135, a display 137, and a controller 140. It will be appreciated that one or more of these components of the control system 102 may vary in certain embodiments, for example as discussed in greater detail further below.

In various embodiments, the sensor array 120 includes various sensors that obtain sensor data for use in detecting a fluid leak of the vehicle 100. In various embodiments, the sensor array 120 includes sensors that provide sensor data for visual identification of the fluid leak as well as for identifying conditions in which the fluid leak detection (and related determinations) are to be performed.

In the depicted embodiment, the sensor array 120 includes the above-referenced one or more front cameras 121 and rear cameras 122, as well as one or more light sensors 123, gear sensors 124, speed sensors 125, inertial measurement unit (IMU) sensors 126, odometer sensors 127, and other sensors 128. It will be appreciated that in certain embodiments the sensor array 120 may also contain any number of other sensors.

In various embodiments, the front cameras 121 are disposed and/or mounted on one or more locations of (or in proximity to) an exterior of the vehicle 100, on a proximate a front location of the vehicle 100. In various embodiments, the front cameras 121 are configured to capture images in front of the vehicle 100, including on a surface of a parking location in front of the vehicle 100. In certain embodiments, the front cameras 121 may also be configured to capture images of a roadway in front of the vehicle 100, other vehicles and other objects in front of the vehicle 100, weather conditions surrounding the vehicle, and so on.

Also in various embodiments, the rear cameras 122 are disposed and/or mounted on one or more locations of (or in proximity to) an exterior of the vehicle 100, on a proximate a rear location of the vehicle 100. In various embodiments, the rear cameras 122 are configured to capture images behind the vehicle 100, including on a surface of a parking location behind the vehicle 100. In certain embodiments, the rear cameras 122 may also be configured to capture images of a roadway behind the vehicle 100, other vehicles and other objects behind the vehicle 100, weather conditions surrounding the vehicle, and so on.

In addition, in various embodiments, the light sensors 123 are also disposed and/or mounted on one or more locations of (or in proximity to) an exterior of the vehicle 100. In various embodiments, the light sensors 123 are configured to detect light conditions surrounding the vehicle 100, including whether there is sufficient light to capture camera images sufficient to detect fluid leakage of the vehicle 100.

Also in various embodiments, the gear sensors 124 are configured to detect a transmission gear and/or other operational gear (e.g., park, reverse, neutral, drive) of the vehicle 100. In various embodiments, the gear sensors 124 are coupled to the drive system 110 and/or one or more input devices and/or processors used in connection therewith.

Also in various embodiments, the speed sensors 125 are configured to measure a speed of the vehicle 100. In certain embodiments, the speed sensors 125 comprise one or more wheel speed sensors; however, this may vary in certain other embodiments.

Also in various embodiments, the IMU sensors 126 are part of and/or coupled to an inertial measurement unit (IMU) of the vehicle 100. In various embodiments, the IMU sensors 126 obtain sensor data used in ascertaining a bank or angle of a roadway on which the vehicle 100 is travelling, or a parking spot in which the vehicle 100 may use (e.g., such as a hill or angle of the parking spot or roadway, and so on), among other possible sensor data. As used throughout this Application, a "parking spot" or "parking location" refers to a particular location along a roadway, parking lot, parking garage, driveway, path, or other surface on which the vehicle 100 may park (e.g., on which the vehicle 100 may remain stationary for at least a predetermined amount of time, such that any fluid leaks may be readily detected via vision technology of the vehicle 100).

In addition, in various embodiments, the odometer sensors 127 obtain sensor information pertaining to an odometer of the vehicle 100, including as to a distance travelled by the vehicle 100.

Finally, in various embodiments, the other sensors 128 may include one or more accelerometers (e.g., for calculating a vehicle speed based on its acceleration), input sensors (e.g., pertaining to brake pedal and/or accelerator pedal inputs from a driver of the vehicle for use in determining likely changes in vehicle speed), and so in certain embodiments.

Also in various embodiments, the location system 130 is configured to obtain and/or generate data as to a position and/or location in which the vehicle 100 is travelling. In certain embodiments, the location system 130 is also configured to obtain and/or generate data as to the position and/or location of one or more parking spots in proximity to the vehicle 100. In certain embodiments, the location system 130 comprises and/or or is coupled to a satellite-based network and/or system, such as a global positioning system (GPS) and/or other satellite-based system.

In certain embodiments, the vehicle 100 also includes a transceiver 135. In various embodiments, the transceiver 135 receives information regarding conditions surrounding the vehicle, such as weather conditions (e.g., including rain, sleet, snow, and so on). In certain embodiments, the transceiver 135 receives information from and/or otherwise communicates with one or more third party providers (e.g., a weather service), and/or with one or more other vehicles and/or other entities (e.g., via vehicle to vehicle and/or vehicle to infrastructure communications). Also in certain embodiments, the transceiver 135 is utilized to send fault reports to the user (e.g., driver) of the vehicle 100, including a classification of detected fluid leaks for the vehicle 100.

In various embodiments, the display 137 provides information as to a fluid leak detected by the control system 102. In certain embodiments, the display 137 provides, among other possible information, a notification that a fluid leak has been detected, along with a description of one or more possible causes and/or types of the fluid leak. In certain embodiments, the display 137 may provide a visual description on a display screen as to the fluid leak. In certain other embodiments, one or more audio, haptic, and/or other notifications may also be provided.

Also in certain embodiments, as alluded to above, the notification of the fluid leak may also be provided to a driver or other user of the vehicle 100 in one or more other manners, such as via an e-mail or text sent to a phone or other electronic device or account of the user (e.g., via the transceiver 135 of the vehicle 100).

In various embodiments, the controller 140 is coupled to the sensor array 120, the location system 130, the transceiver 135, and the display 137. Also in various embodiments, the controller 140 comprises a computer system (also referred to herein as computer system 140), and includes a processor 142, a memory 144, an interface 146, a storage device 148, and a computer bus 150. In various embodiments, the controller (or computer system) 140 detects a fluid leak for the vehicle 100 based on the sensor data obtained from the sensor array 120 (and, in certain embodiments, based also on the location data obtained from the location system 130 and/or the weather data and/or other data obtained via the transceiver 135). Also in various embodiments, the controller 140 makes determinations as to one or more possible causes and/or types of the fluid leak, and provides instructions for a notification that is provided for a driver and/or other user of the vehicle 100 as to the fluid leak (e.g., via the display 137 of the vehicle 100 and/or to a phone or other electronic device of the user, and so on). In various embodiments, the controller 140 provides these and other functions in accordance with the steps of the process 200 of FIGS. 2 and 3 and as described further below in connection therewith.

In various embodiments, the controller 140 (and, in certain embodiments, the control system 102 itself) is disposed within the body 104 of the vehicle 100. In one embodiment, the control system 102 is mounted on the chassis 116. In certain embodiments, the controller 140 and/or control system 102 and/or one or more components thereof may be disposed outside the body 104, for example on a remote server, in the cloud, or other device where image processing is performed remotely.

It will be appreciated that the controller 140 may otherwise differ from the embodiment depicted in FIG. 1. For example, the controller 140 may be coupled to or may otherwise utilize one or more remote computer systems and/or other control systems, for example as part of one or more of the above-identified vehicle 100 devices and systems.

In the depicted embodiment, the computer system of the controller 140 includes a processor 142, a memory 144, an interface 146, a storage device 148, and a bus 150. The processor 142 performs the computation and control functions of the controller 140, and may comprise any type of processor or multiple processors, single integrated circuits such as a microprocessor, or any suitable number of integrated circuit devices and/or circuit boards working in cooperation to accomplish the functions of a processing unit. During operation, the processor 142 executes one or more programs 152 contained within the memory 144 and, as such, controls the general operation of the controller 140 and the computer system of the controller 140, generally in executing the processes described herein, such as the process 200 of FIGS. 2 and 3 and as described further below in connection therewith.

The memory 144 can be any type of suitable memory. For example, the memory 144 may include various types of dynamic random access memory (DRAM) such as SDRAM, the various types of static RAM (SRAM), and the various types of non-volatile memory (PROM, EPROM, and flash). In certain examples, the memory 144 is located on and/or co-located on the same computer chip as the processor 142. In the depicted embodiment, the memory 144 stores the above-referenced program 152 along with map data 154 (e.g., from and/or used in connection with the location system 130 and/or transceiver 135) and one or more stored values 156 (e.g., including, in various embodiments, threshold values with respect to sensor data for performing the fluid leak detection and/or other threshold values used in identifying the fluid leak, and so on).

The bus 150 serves to transmit programs, data, status and other information or signals between the various components of the computer system of the controller 140. The interface 146 allows communication to the computer system of the controller 140, for example from a system driver and/or another computer system, and can be implemented using any suitable method and apparatus. In one embodiment, the interface 146 obtains the various data from the sensor array 120, the location system 130, and/or the transceiver 135. The interface 146 can include one or more network interfaces to communicate with other systems or components. The interface 146 may also include one or more network interfaces to communicate with technicians, and/or one or more storage interfaces to connect to storage apparatuses, such as the storage device 148.

The storage device 148 can be any suitable type of storage apparatus, including various different types of direct access storage and/or other memory devices. In one exemplary embodiment, the storage device 148 comprises a program product from which memory 144 can receive a program 152 that executes one or more embodiments of the process 200 of FIGS. 2 and 3 and as described further below in connection therewith. In another exemplary embodiment, the program product may be directly stored in and/or otherwise accessed by the memory 144 and/or a disk (e.g., disk 157), such as that referenced below.

The bus 150 can be any suitable physical or logical means of connecting computer systems and components. This includes, but is not limited to, direct hard-wired connections, fiber optics, infrared and wireless bus technologies. During operation, the program 152 is stored in the memory 144 and executed by the processor 142.

It will be appreciated that while this exemplary embodiment is described in the context of a fully functioning computer system, those skilled in the art will recognize that the mechanisms of the present disclosure are capable of being distributed as a program product with one or more types of non-transitory computer-readable signal bearing media used to store the program and the instructions thereof and carry out the distribution thereof, such as a non-transitory computer readable medium bearing the program and containing computer instructions stored therein for causing a computer processor (such as the processor 142) to perform and execute the program. Such a program product may take a variety of forms, and the present disclosure applies equally regardless of the particular type of computer-readable signal bearing media used to carry out the distribution. Examples of signal bearing media include: recordable media such as floppy disks, hard drives, memory cards and optical disks, and transmission media such as digital and analog communication links. It will be appreciated that cloud-based storage and/or other techniques may also be utilized in certain embodiments. It will similarly be appreciated that the computer system of the controller 140 may also otherwise differ from the embodiment depicted in FIG. 1, for example in that the computer system of the controller 140 may be coupled to or may otherwise utilize one or more remote computer systems and/or other control systems.

Figure 2:
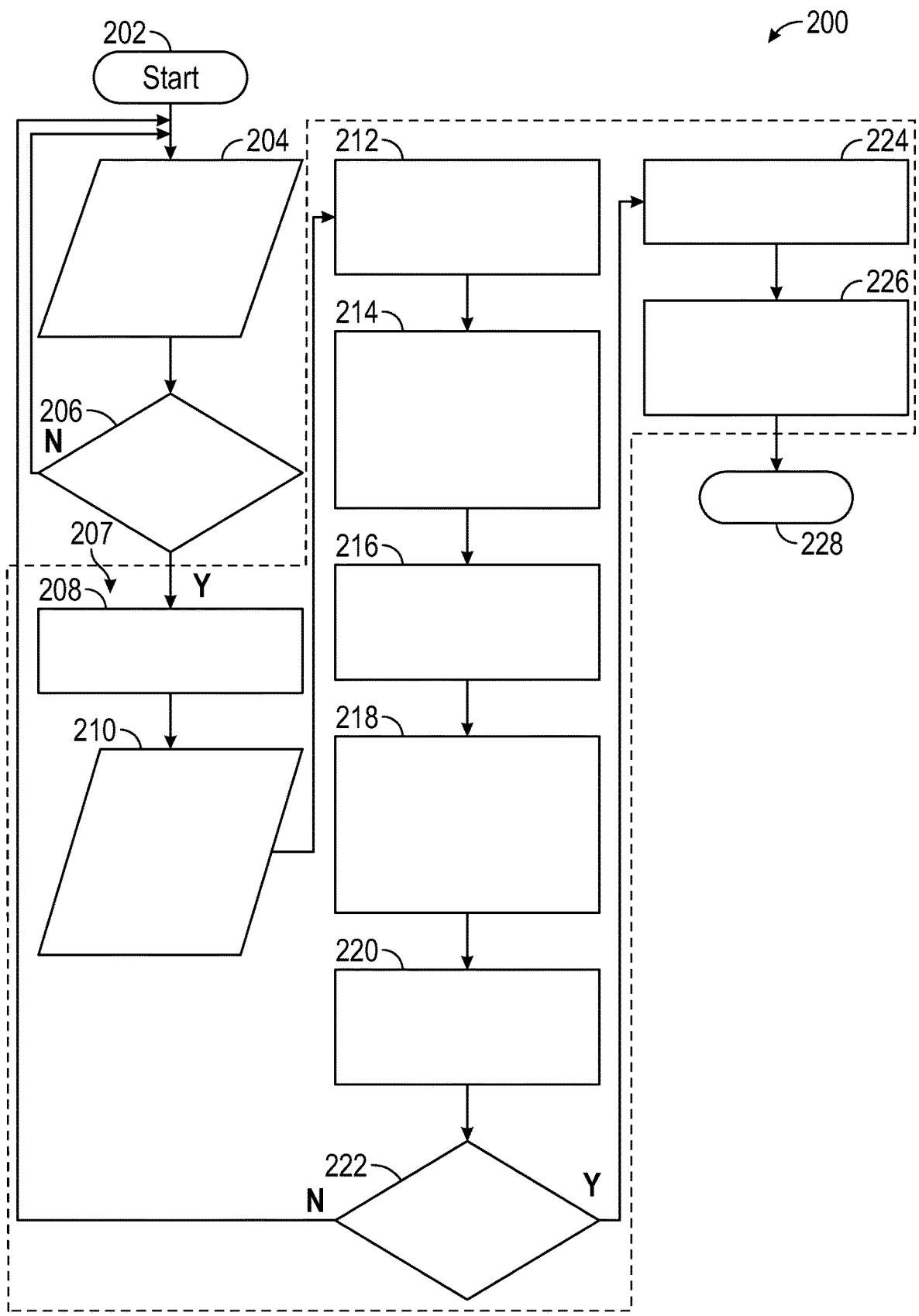
FIG. 2 is a flowchart of a process for detecting fluid leaks of vehicles using vision-based technology, and that can be implemented in connection with the vehicle and control system of FIG. 1, in accordance with exemplary embodiments.

With reference to FIG. 2, a flowchart is provided of a process 200 for detecting fluid leaks of vehicles using vision-based technology, in accordance with exemplary embodiments. In various embodiments, the process 200 can be implemented in connection with the vehicle 100 of FIG. 1, including the control system 102 thereof. The process 200 is described below in connection with FIG. 2 as well as FIG. 3, which depicts a sub-process 207 for a series of steps of the process 200 of FIG. 2, including the detection and identification of the fluid leak via a health assessment, in accordance with exemplary embodiments.

As depicted in FIG. 2, the process 200 begins at step 202. In one embodiment, the process 200 begins when a vehicle drive or ignition cycle begins, for example when a driver or other user approaches or enters the vehicle 100, when the driver or other user turns on the vehicle and/or an ignition therefor (e.g. by turning a key, engaging a keyfob or start button, and so on), or when the vehicle begins operation (e.g., by a driver action for a driver-controlled vehicle or via the control system 102 in the case of autonomous vehicle). In certain embodiments, the steps of the process 200 are performed continuously during operation of the vehicle.

In various embodiments, vehicle and environmental data are obtained (step 204). In various embodiments, sensor data is obtained from the sensor array 120 of FIG. 1, including: (i) front camera images in front of the vehicle from the front cameras 121; (ii) rear camera images behind the vehicle from the rear cameras 122; (iii) light sensor data as to a level of light surrounding the vehicle, from the light sensors 123; (iv) gear data from the gear sensors 124 as to a transmission gear and/or other operating gear of the vehicle (e.g., park, reverse, neutral, drive); (v) speed data as to a speed of the vehicle or related data used to calculate the vehicle speed, from the speed sensors 125; (vi) inertial measurement data from the IMU sensors 126 (e.g., including as to an angle or slope of a parking spot or roadway in proximity to the vehicle), and (vii) odometer data, such as from the odometer sensors 127, including as to a distance travelled by the vehicle.

In addition, in various embodiments, also as part of step 204, location data is also obtained as to a current location of the vehicle and a roadway or parking spot in which the vehicle is travelling and/or is located (e.g., via the location system 130). Also in various embodiments, environmental data (including weather data) is obtained via the transceiver 135 (e.g., from one or more weather services, other vehicles, infrastructure, and the like), along with a current time of day. In certain embodiments, weather conditions and/or other environmental conditions may also be ascertained via one or more sensors from the sensor array 120, such as via one or more of the front cameras 121, rear cameras 122, and/or light sensors 123. In addition, in various embodiments, map information is also obtained for the location of the vehicle (and surrounding roadways and parking spots), for example as may be stored as map data 154 in the memory 144 of the vehicle 100 and/or obtained via the transceiver 135 and/or location system 130.

In various embodiments, a determination is made to schedule an assessment (step 206). In various embodiments, during step 206, an assessment is made as to whether to perform an intelligent health scheduler using vision technology in order to ascertain whether there is a fluid leak for the vehicle. In various embodiments, this determination is made by the processor 142 of FIG. 1 based on the various data obtained during step 204. In various embodiments, a determination is made to schedule the assessment when the data indicates that conditions are such that the front and/or rear cameras 121, 122 would be able to capture any such fluid leak for the vehicle. In certain embodiments, the determination is made to schedule the assessment when each of the following conditions are satisfied, namely, that: (i) location data indicates that a parking spot is nearby; (ii) a current time of day is consistent with vehicle parking; (iii) the road inclination meets a predefined criteria (e.g., in certain embodiments, the road inclination is less than a predetermined threshold, such that any fluid leaking from the vehicle would not quickly move downhill away from the vehicle); (iv) light conditions are sufficient for capturing camera images of any fluid leak (e.g., when a light condition exceeds a predetermined threshold, such as during daytime and/or when a parking spot or roadway is well illuminated); (v) weather conditions are sufficient for capturing images of any fluid leak (e.g., when it is not raining or snowing, or the like); (vi) one or more camera conditions are satisfied (e.g., when one or more of the front cameras 121 and rear cameras 122 are operating correctly); and (vii) that the vehicle parks (e.g., is stationary) at the parking spot for at least a predetermined amount of time.

In various embodiments, when it is determined during step 206 that an assessment is not to be scheduled, then the process then returns to step 204 in various embodiments. In various embodiments, steps 204 and 206 thereafter repeat in various iterations (preferably continuously) until a determination is made during an iteration of step 206 that an assessment is scheduled.

In various embodiments, once it is determined during an iteration of step 206 that an assessment is to be scheduled, then the health assessment is implemented. In various embodiments, the health assessment is implemented in sub-process 207, which includes steps 208-226 of FIG. 2 as well as steps 302-352 of FIG. 3 in various embodiments.

With continued reference to FIG. 2, the health assessment of sub-process 207 includes, in various embodiments, a monitoring of the parking action (step 208). In various embodiments, the process 200 monitors vehicle instructions and actions with respect to a parking event. In various embodiments, as part of step 208 and/or in combination with step 208, various vehicle parameters are monitored in step 210, including monitoring of vehicle speed, acceleration or deceleration, IMU sensor data, odometer readings, and gear changes (e.g., changes in gear shifter position). In various embodiments, the monitoring of steps 208-210 is performed by the processor 142 of FIG. 1 using updated sensor data from step 204. For example, in various embodiments, the vehicle may be determined to be approaching a parking spot and/or about to begin a parking maneuver when the vehicle decelerates, and/or when one or more odometer, location, map and/or other readings indicate that the vehicle is approaching an intended parking spot, and/or when the gear is shifted from drive to park, and so on, among other possible examples. In addition, also in various embodiments, the vehicle may be determined to be leaving a parking spot and/or about to complete a parking maneuver when the vehicle accelerates from a standstill, and/or when the gear is shifted from park to driver or reverse, among other possible examples.

Also in various embodiments, a determination is made as to a parking direction for entering a parking spot (step 212). In various embodiments, the processor 142 of FIG. 1 determines a direction in which the vehicle is entering, or is about to enter the parking spot. In certain embodiments, this determination comprises a determination as to whether the vehicle is moving (a) forward into the parking spot, or (b) backward into the parking spot. In various embodiments, this determination may be made by the processor 142 via sensor data, such as a direction of movement of the vehicle, and/or whether the transmission gear of the vehicle has been moved to "drive" (e.g., forward) or "reverse" (e.g., backward), and so on.

In various embodiments, the appropriate cameras are activated for capturing pre-parking images (step 214). In various embodiments, the processor 142 of FIG. 1 selects either the front cameras 121 or rear cameras 122 for capturing pre-parking images of the parking spot in which the vehicle 100 is about to park while the vehicle 100 is approaching the parking spot. Specifically, in various embodiments, the processor 142 selects the one or more front cameras 121 for activation when the vehicle 100 is about to move forward into the parking spot. Conversely, also in various embodiments, the processor 142 instead selects the one or more rear cameras 122 for activation when the vehicle 100 is about to move backward into the parking spot. In various embodiments, in either case, the activated cameras (either front cameras 121 or the rear cameras 122) capture the camera images of the parking spot just before the vehicle 100 parks in the parking spot (e.g., as the vehicle 100 is approaching the parking spot).

In addition, in various embodiments, a determination is made as to a parking direction for exiting the parking spot (step 216). In various embodiments, the processor 142 of FIG. 1 determines a direction in which the vehicle is exiting, or is about to exit, the parking spot. In certain embodiments, this determination comprises a determination as to whether the vehicle is moving (a) forward to exit the parking spot, or (b) backward to exit the parking spot. In various embodiments, this determination may be made by the processor 142 via sensor data, such as a direction of movement of the vehicle, and/or whether the transmission gear of the vehicle has been moved to "drive" (e.g., forward) or "reverse" (e.g., backward), and so on.

In various embodiments, the appropriate cameras are activated for capturing post-parking images (step 218). In various embodiments, the processor 142 of FIG. 1 selects either the front cameras 121 or rear cameras 122 for capturing post-parking images of the parking spot in which the vehicle 100 has just parked (as the vehicle 100 is leaving the parking spot). Specifically, in various embodiments, the processor 142 selects the one or more rear cameras 122 for activation when the vehicle 100 is about to move forward to exit the parking spot. Conversely, also in various embodiments, the processor 142 instead selects the one or more front cameras 121 for activation when the vehicle 100 is about to move backward to exit the parking spot. In various embodiments, in either case, the activated cameras (either front cameras 121 or the rear cameras 122) capture the camera images of the parking spot just after the vehicle 100 has finished parking in the parking spot (e.g., as the vehicle 100 is leaving, or travelling away from, the parking spot).

In various embodiments, analysis is performed with respect to the camera images (step 220). Specifically, in various embodiments, the processor 142 of FIG. 1 analyzes the camera images of steps 214 and 218 by comparing and contrasting the pre-parking camera images of step 214 versus the post-parking camera images of step 218. In various embodiments, as part of this analysis, the processor 142 ascertains differences of fluid appearances in the respective camera images, including differences in size, texture, location, and color thereof. In certain embodiments, the analysis also includes detection of differential color features between the post-parking images versus the pre-parking images as well as image transformation, among other possible vision technology techniques.

In various embodiments, a determination is made as to whether a fluid leak is present under the vehicle (step 222). In various embodiments, this determination is made by the processor 142 of FIG. 1 based on the pre-parking camera images of step 214, the post-parking camera images of step 218, and the analysis conducted during step 220. In various embodiments, a fluid leak is determined to be present when differences in one or more of the size, texture, location, and/or color of the detected fluid as compared between the pre-parking versus post-parking camera images exceed one or more predetermined thresholds.

In various embodiments, if it is determined during step 222 that a fluid leak is not detected, then the process returns to step 204 in a new iteration. In various embodiments, steps 204-222 thereafter repeat in new iterations until a determination is made in an iteration of step 222 that a fluid leak is detected.

Once it is determined during an iteration of step 222 that a fluid leak is detected under the vehicle, then determinations are made as to characteristics of the fluid leak (step 224). Specifically, in various embodiments, a fluid type and severity are determined by the processor 142 of FIG. 1 based on the pre-parking camera images of step 214, the post-parking camera images of step 218, and the analysis and determinations performed during steps 220-222.

For example, in various embodiments, the severity is determined by the amount of fluid detected in the pre-parking camera images of step 214, the post-parking camera images of step 218, such as via a calculated or estimated surface area and depth of the fluid captured in the pre-parking camera images and the post-parking camera images.

In addition, also in various embodiments, the fluid type is further determined based on an analysis of the color and location of the fluid captured in the pre-parking camera images and the post-parking camera images. For example, with respect to location, a fluid leak near the rear of the vehicle 100 may be determined to be a brake fluid leak, whereas a fluid leak near the front of the vehicle 100 may be determined to be a transmission or coolant leak, and so on. By way of additional example, with respect to color, the detected color of the fluid leak may be compared with a library of different fluid colors, for example as may be provided by the manufacturer of the vehicle 100 and/or stored in the memory 144 of the vehicle 100 as stored values 156 thereof, and so on.

In various embodiments, a report is generated (step 226). In various embodiments, the processor 142 of FIG. 1 generates a fault report with respect to the classification of the fluid leak, including as to the determined severity and type thereof. In addition, also in various embodiments, the fault report also includes an associated cause for the fluid leak (e.g., based on the analysis performed above). In various embodiments, the report is provided to a user (e.g., a driver) of the vehicle 100 in accordance with instructions provided by the processor 142. In certain embodiments, the report is provided via the display 137 of FIG. 1, for example on a display screen thereof (and/or, in certain embodiments, as part of an audio and/or haptic notification) in accordance with the instructions provided by the processor 142. Also in certain embodiments, the report is provided to a phone or other electronic device of the user, for example as transmitted via the transceiver 135 in accordance with the instructions provided by the processor 142.

In various embodiments, the process then terminates at step 228.

As noted above, and with reference again to FIG. 3, further steps are depicted in FIG. 3 with respect to the sub-process 207 of FIG. 2 for the health assessment, in accordance with exemplary embodiments.

As depicted in FIG. 3, various parameters are monitored for a parking event for the vehicle (step 302). In certain embodiments, vehicle speed and other enablers are monitored for the parking event, via the processor 142 of FIG. 1. In certain embodiments, this corresponds with, is part of, and/or is performed in conjunction with step 208 described above in connection with FIG. 2.

Also in various embodiments, determinations are made as to whether a parking event is being initiated (step 304) or whether a parking event is being terminated (step 306). In certain embodiments, a parking event is determined to being initiated when the vehicle 100 is approaching a parking spot. Conversely, also in certain embodiments, a parking event is determined to being terminated when the vehicle 100 is pulling out of a parking spot. In various embodiments, these determinations of steps 304 and 306 are made by the processor 142 via sensor data, such as a direction of movement of the vehicle, and/or whether the transmission gear of the vehicle has been moved to "drive" (e.g., forward) or "reverse" (e.g., backward), and so on.

In various embodiments, if it is determined at step 304 that the vehicle 100 a parking event is being initiated (i.e., that the vehicle 100 is heading toward a parking spot), then the process proceeds along a first path 310 as depicted in FIG. 3, beginning with step 312 (described below). Conversely, if it is instead determined at step 304 that the vehicle 100 a parking event is being terminated (i.e., that the vehicle 100 is heading away from a parking spot), then process proceeds instead along a second path 330 as depicted in FIG. 3, beginning with step 332 (described below).

In various embodiments, during the first path 310 (i.e., when the vehicle 100 is heading toward the parking spot), vehicle data is monitored (step 312). In various embodiments, the speed and the gear position are monitored via the processor 142 of FIG. 1 using the sensor data from the sensor array 120 of FIG. 1. In certain embodiments, this corresponds with, is part of, and/or is performed in conjunction with step 210 described above in connection with FIG. 2.

Also in various embodiments, determinations are made as to whether the vehicle is entering the parking spot in a forward manner (step 314) or a reverse manner (step 316). In various embodiments, the processor 142 of FIG. 1 determines that the vehicle is entering the parking spot in a forward manner in step 314 when the vehicle 100 is moving forward to park into the parking spot, using the "drive" gear (e.g., as determined using sensor data as to the direction of movement of the vehicle 100 and/or the gear selection of the vehicle 100). Conversely, also in various embodiments, the processor 142 of FIG. 1 determines that the vehicle is entering the parking spot in a reverse manner in step 316 when the vehicle 100 is moving backward (i.e., in reverse) to park into the parking spot, using the "reverse" gear (e.g., as determined using sensor data as to the direction of movement of the vehicle 100 and/or the gear selection of the vehicle 100). In certain embodiments, this corresponds with, is part of, and/or is performed in conjunction with step 212 described above in connection with FIG. 2.

In various embodiments, when it is determined in step 314 that the vehicle is entering the parking spot in a forward manner (e.g., using the drive gear), the front cameras 121 are utilized to capture camera images of the parking spot in front of the vehicle 100 (step 318). In various embodiments, during step 318, the front cameras 121 capture images of the parking spot as the vehicle 100 approaches the parking spot (and just before the vehicle 100 parks in the parking spot) moving forward in accordance with instructions provided by the processor 142 of FIG. 1. In various embodiments, the camera images of the parking spot are thus taken with a front view 322 in front of the vehicle. In various embodiments, the camera images are then analyzed beginning with step 326, described in greater detail further below.

Conversely, in various embodiments, when it is instead determined in step 316 that the vehicle is entering the parking spot in a rearward manner (e.g., using the reverse gear), the rear cameras 122 are utilized instead to capture camera images of the parking spot behind the vehicle 100 (step 320). In various embodiments, during step 320, the rear cameras 122 capture images of the parking spot as the vehicle 100 approaches the parking spot (and just before the vehicle 100 parks in the parking spot) moving backward in accordance with instructions provided by the processor 142 of FIG. 1. In various embodiments, the camera images of the parking spot are thus taken with a rear view 324 behind the vehicle. In various embodiments, the camera images are then analyzed beginning with step 326, described in greater detail further below.

In certain embodiments, steps 318-324 correspond with, are part of, and/or are performed in conjunction with step 214 described above in connection with FIG. 2.

With reference back to step 306 and the second path 330, during the second path 330 (i.e., when the vehicle 100 is heading away from the parking spot), vehicle data is monitored (step 332). In various embodiments, the speed and the gear position are monitored via the processor 142 of FIG. 1 using the sensor data from the sensor array 120 of FIG. 1. In certain embodiments, this corresponds with, is part of, and/or is performed in conjunction with step 210 described above in connection with FIG. 2.

Also in various embodiments, determinations are made as to whether the vehicle is exiting the parking spot in a reverse manner (step 334) or a forward manner (step 336). In various embodiments, the processor 142 of FIG. 1 determines that the vehicle is exiting the parking spot in a reverse manner in step 334 when the vehicle 100 is moving in reverse to exit the parking spot, using the "reverse" gear (e.g., as determined using sensor data as to the direction of movement of the vehicle 100 and/or the gear selection of the vehicle 100). Conversely, also in various embodiments, the processor 142 of FIG. 1 determines that the vehicle is exiting the parking spot in a forward manner in step 336 when the vehicle 100 is moving forward to move away from the parking spot, using the "drive" gear (e.g., as determined using sensor data as to the direction of movement of the vehicle 100 and/or the gear selection of the vehicle 100). In certain embodiments, this corresponds with, is part of, and/or is performed in conjunction with step 216 described above in connection with FIG. 2.

In various embodiments, when it is determined in step 334 that the vehicle is exiting the parking spot in a reverse manner (e.g., using the reverse gear), the front cameras 121 are utilized to capture camera images of the parking spot in front of the vehicle 100 (step 338). In various embodiments, during step 338, the front cameras 121 capture images of the parking spot as the vehicle 100 exits the parking spot in reverse (and just after the vehicle 100 leaves the parking spot) in accordance with instructions provided by the processor 142 of FIG. 1. In various embodiments, the camera images of the parking spot are thus taken with a front view 342 in front of the vehicle. In various embodiments, the camera images are then analyzed beginning with step 346, described in greater detail further below.

Conversely, in various embodiments, when it is instead determined in step 336 that the vehicle is exiting the parking spot in a forward manner (e.g., using the drive gear), the rear cameras 122 are utilized instead to capture camera images of the parking spot behind the vehicle 100 (step 340). In various embodiments, during step 340, the rear cameras 122 capture images of the parking spot as the vehicle 100 leaves the parking spot moving forward, in accordance with instructions provided by the processor 142 of FIG. 1. In various embodiments, the camera images of the parking spot are thus taken with a rear view 344 behind the vehicle. In various embodiments, the camera images are then analyzed beginning with step 346, described in greater detail further below.

In certain embodiments, steps 338-344 correspond with, are part of, and/or are performed in conjunction with step 218 described above in connection with FIG. 2.

In various embodiments, during the above-referenced step 326, a baseline image is constructed of the space under the vehicle. Specifically, in various embodiments, during step 326, a baseline image is constructed for the space of the parking spot under the vehicle 100 (from before the vehicle 100 parks in the parking spot) using the pre-parking camera images of step 318 or 324 (depending on whether the front view 322 or rear view 324 camera images are obtained). In various embodiments, the processor 142 of FIG. 2 uses the pre-parking camera images using computer vision processing techniques to generate the baseline image in step 326.

Also in various embodiments, during the above-referenced step 346, a final image is constructed of the space under the vehicle. Specifically, in various embodiments, during step 324, a final image is constructed for the space of the parking spot under the vehicle 100 (from after the vehicle 100 has finished parking in the parking spot) using the post-parking camera images of step 338 or 340 (depending on whether the front view 342 or rear view 344 camera images are obtained). In various embodiments, the processor 142 of FIG. 2 uses the post-parking camera images using computer vision processing techniques to generate the final image in step 346.

In various embodiments, the baseline image of step 326 and the final image of step 346 are compared in steps 348-352, described below.

Specifically, in various embodiments, an exposure and white balance of the baseline image and the final image are compared (step 348). In various embodiments, the processor 142 of FIG. 2 uses computer vision techniques to compare the exposure and white balance between the baseline image and the final image.

In addition, in various embodiments, color features of the baseline image and the final image are compared (step 350). In various embodiments, the processor 142 of FIG. 1 uses computer vision techniques to compare the color features between the pre-parking camera images and the post-parking camera images.

In various embodiments, one or more determinations are made regarding the fluid leak (step 352). Specifically, in various embodiments, the processor 142 of FIG. 1 makes one or more determinations as to the intensity, type, and cause of the leak, based on the comparisons between the baseline image of step 326 and the final image of step 346, including the comparisons of the respective match exposure and white balance of step 348 as well as the comparisons of the respective color features of step 350. In addition, in various embodiments, the one or more determinations as to the intensity, type, and cause of the leak may also be made based on other comparisons between the baseline image and the final image, for example, based on the locations of the fluid leak, as well as a comparison with a library of data pertaining to fluid information for the vehicle 100 and respective colors, locations, and causes pertaining thereto (for example as discussed above).

In certain embodiments, steps 326, 348, 346, 350, and 352 correspond with, are part of, and/or are performed in conjunction with step 220-224 described above in connection with FIG. 2.

In addition, in various embodiments, the determinations of step 352 are utilized in generating of the fault report of step 226 of FIG. 2, and in providing the fault report to the user (e.g., a driver) of the vehicle 100 (e.g., as described above) before the process terminates at step 228 of FIG. 2.

Accordingly, methods, systems, and vehicles are provided for detecting fluid leaks in vehicles, in accordance with exemplary embodiments. In various embodiments, camera images are generated of a parking spot before and after a vehicle parks in the parking spot. Also in various embodiments, particular cameras (e.g., front cameras or rear cameras) are selected based on the direction of movement of the vehicle into and out of the parking spot. In addition, in various embodiments, pre-parking camera images are compared with post-parking camera images, and the comparisons are utilized for making determinations regarding the fluid leak including the severity and type thereof.

In various embodiments, the techniques described herein may be used in connection with vehicles having a human driver, but that also have automatic functionality (e.g., adaptive cruise control). In various embodiments, the techniques described herein may also be used in connection autonomous vehicles, such as semi-autonomous and/or fully autonomous vehicles, and/or in connection with a fleet of vehicles.

It will be appreciated that the systems, vehicles, and methods may vary from those depicted in the Figures and described herein. For example, the vehicle 100 and/or control system 102 of FIG. 1 and/or components thereof may differ from that depicted in FIG. 1. It will similarly be appreciated that the steps of the process 200 may differ from those depicted in FIGS. 2 and 3 and/or that various steps of the process 200 may occur concurrently and/or in a different order than that depicted in FIGS. 2 and 3.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. A method comprising:
obtaining first camera images of a parking location before a vehicle is parked at the parking location;
obtaining second camera images of the parking location after the vehicle is parked at the parking location;
detecting, via a processor, a fluid leak for the vehicle based on a comparison of the first camera images and the second camera images, including by utilizing computer vision techniques to compare an exposure and white balance between the first camera images and the second camera images along with a library of color data pertaining to fluid information for the vehicle;
obtaining sensor data via one or more sensors of the vehicle; and
scheduling an assessment, via the processor as to whether to perform an intelligent health scheduler using vision technology in order to ascertain whether there is a fluid leak for the vehicle, based on whether a plurality of health scheduler conditions are satisfied, including: (i) location data of the sensor data indicates that a parking spot is nearby; (ii) a current time of day is consistent with vehicle parking; (iii) a road inclination is less than a predetermined threshold; (iv) a light condition level exceeds a predetermined threshold; (v) weather conditions are sufficient for capturing images of any fluid leak; (vi) one or more camera conditions are satisfied for proper camera operation; and (vii) the vehicle is stationary at the parking spot for at least a predetermined amount of time;
wherein the steps of obtaining the first camera images, obtaining the second camera images, and detecting the fluid leak based on the comparison of the first camera images and the second camera images are performed based on whether each of the plurality of health scheduler conditions are satisfied.

2. The method of claim 1, wherein the parking location comprises a parking spot at which the vehicle is parked for at least a predetermined amount of time.

3. The method of claim 1, wherein:
the first camera images and the second camera images are obtained via one or more cameras onboard the vehicle; and
the fluid leak is detected by the processor, the processor being disposed onboard the vehicle and coupled to the one or more cameras onboard the vehicle.

4. The method of claim 3,
wherein the sensor data further pertains to a first direction of movement of the vehicle as the vehicle approaches the parking location, and as to a second direction of movement of the vehicle as the vehicle leaves the parking location;
wherein the obtaining of the first camera images and the obtaining of the second camera images include activating selected cameras of the one or more cameras onboard the vehicle based on the first direction of movement and the second direction of movement.

5. The method of claim 4, wherein:
the step of obtaining the first camera images comprises:
activating one or more front cameras of the vehicle for capturing the first camera images before the vehicle is parked at the parking location, when it is determined that the first direction of movement is forward; and
activating one or more rear cameras of the vehicle, instead of the one or more front cameras of the vehicle, for capturing the first camera images before the vehicle is parked at the parking location, when it is determined that the first direction of movement is reverse; and
the step of obtaining the second camera images comprises:
activating the one or more front cameras of the vehicle for capturing the second camera images after the vehicle is parked at the parking location, when it is determined that the second direction of movement is reverse; and
activating the one or more rear cameras of the vehicle, instead of the one or more front cameras of the vehicle, for capturing the second camera images after the vehicle is parked at the parking location, when it is determined that the second direction of movement is forward.

6. The method of claim 1, further comprising:
determining, via the processor, a classification as to an intensity, type, and cause of the fluid leak, based on a comparison of color differences of fluid detected between the first camera images and the second camera images along with comparisons of the exposure and white balance between the first camera images and the second camera images with the library of color data pertaining to fluid information for the vehicle.

7. The method of claim 1, further comprising:
determining, via the processor, a classification of the fluid leak, based on a comparison of differences in a location with respect to the vehicle fluid detected between the first camera images and the second camera images with a library of location data pertaining to fluid information for the vehicle.

8. The method of claim 1, further comprising:
generating, via instructions provided by the processor, a report with a classification of the fluid leak based on the comparison between the first camera images and the second camera images; and
providing, via instructions provided by the processor, the report to a user of the vehicle.

9. A system comprising:
one or more sensors of a vehicle that are configured to obtain sensor data as to a first direction of movement of the vehicle as the vehicle approaches a parking location, and as to a second direction of movement of the vehicle as the vehicle leaves the parking location; and a processor coupled to the one or more sensors and configured to at least facilitate:

obtaining first camera images of the parking location before the vehicle is parked at the parking location, by activating one or more first cameras onboard the vehicle based on the first direction of movement;

obtaining second camera images of the parking location after the vehicle is parked at the parking location, by activating one or more second cameras onboard the vehicle based on the second direction of movement;

detecting a fluid leak for the vehicle based on a comparison of the first camera images and the second camera images, including by utilizing computer vision techniques to compare an exposure and white balance between the first camera images and the second camera images along with a library of color data pertaining to fluid information for the vehicle; and scheduling an assessment as to whether to perform an intelligent health scheduler using vision technology in order to ascertain whether there is a fluid leak for the vehicle, based on whether a plurality of health scheduler conditions are satisfied, including: (i) location data of the sensor data indicates that a parking spot is nearby; (ii) a current time of day is consistent with vehicle parking; (iii) a road inclination is less than a predetermined threshold; (iv) a light condition level exceeds a predetermined threshold; (v) weather conditions are sufficient for capturing images of any fluid leak; (vi) one or more camera conditions are satisfied for proper camera operation; and (vii) the vehicle is stationary at the parking spot for at least a predetermined amount of time;

wherein the obtaining of the first camera images, the obtaining of the second camera images, and the of detecting the fluid leak based on the comparison of the first camera images and the second camera images are performed based on whether each of the plurality of health scheduler conditions are satisfied.

10. The system of claim 9, wherein the processor is configured to at least facilitate:

obtaining the first camera images by:

activating one or more front cameras of the vehicle for capturing the first camera images before the vehicle is parked at the parking location, when it is determined that the first direction of movement is forward; and activating one or more rear cameras of the vehicle, instead of the one or more front cameras of the vehicle, for capturing the first camera images before the vehicle is parked at the parking location, when it is determined that the first direction of movement is reverse; and obtaining the second camera images by:

activating the one or more front cameras of the vehicle for capturing the second camera images after the vehicle is parked at the parking location, when it is determined that the second direction of movement is reverse; and activating the one or more rear cameras of the vehicle, instead of the one or more front cameras of the vehicle, for capturing the second camera images after the vehicle is parked at the parking location, when it is determined that the second direction of movement is forward.

11. The system of claim 9, wherein the processor is further configured to at least facilitate determining a classification as to an intensity, type, and cause of the fluid leak, based on a comparison of color differences of fluid detected between the first camera images and the second camera images along with comparisons of the exposure and white balance between the first camera images and the second camera images with the library of color data pertaining to fluid information for the vehicle.

12. The system of claim 9, wherein the processor is further configured to at least facilitate determining a classification of the fluid leak, based on a comparison of differences in a location with respect to the vehicle fluid detected between the first camera images and the second camera images with a library of location data pertaining to fluid information for the vehicle.

13. The system of claim 9, wherein the processor is further configured to at least facilitate:

generating a report with a classification of the fluid leak based on the comparison between the first camera images and the second camera images; and providing the report to a user of the vehicle.

14. A vehicle comprising:

a body;

a propulsion system configured to generate movement of the body;

one or more sensors of a vehicle that are configured to obtain sensor data as to the vehicle;

one or more cameras disposed onboard the vehicle and configured to at least facilitate:

obtaining first camera images of a parking location before the vehicle is parked at the parking location; and obtaining second camera images of the parking location after the vehicle is parked at the parking location; and a processor that is coupled to the one or more cameras and configured to at least facilitate:

detecting a fluid leak for the vehicle based on a comparison of the first camera images and the second camera images, including by utilizing computer vision techniques to compare an exposure and white balance between the first camera images and the second camera images along with a library of color data pertaining to fluid information for the vehicle; and scheduling an assessment as to whether to perform an intelligent health scheduler using vision technology in order to ascertain whether there is a fluid leak for the vehicle, based on whether a plurality of health scheduler conditions are satisfied, including: (i) location data of the sensor data indicates that a parking spot is nearby; (ii) a current time of day is consistent with vehicle parking; (iii) a road inclination is less than a predetermined threshold; (iv) a light condition level exceeds a predetermined threshold; (v) weather conditions are sufficient for capturing images of any fluid leak; (vi) one or more camera conditions are satisfied for proper camera operation; and (vii) the vehicle is stationary at the parking spot for at least a predetermined amount of time; wherein the obtaining of the first camera images, the obtaining of the second camera images, and the of detecting the fluid leak based on the comparison of the first camera images and the second camera images are performed based on whether each of the plurality of health scheduler conditions are satisfied;

wherein the obtaining of the first camera images, the obtaining of the second camera images, and the of detecting the fluid leak based on the comparison of the first camera images and the second camera images are performed based on whether each of the plurality of health scheduler conditions are satisfied.

15. The vehicle of claim 14, wherein the parking location comprises a parking spot at which the vehicle is parked for at least a predetermined amount of time.

16. The vehicle of claim 14,
wherein the one or more sensors are disposed onboard the vehicle and configured to obtain the sensor data as to a first direction of movement of the vehicle as the vehicle approaches the parking location, and as to a second direction of movement of the vehicle as the vehicle leaves the parking location;
wherein the processor is configured to at least facilitate activating selected cameras of the one or more cameras onboard the vehicle based on the first direction of movement and the second direction of movement; and
wherein:
the one or more cameras include one or more front cameras of the vehicle and one or more rear cameras of the vehicle; and
the processor is further configured to at least facilitate:
activating the one or more front cameras of the vehicle for capturing the first camera images before the vehicle is parked at the parking location, when it is determined that the first direction of movement is forward;
activating the one or more rear cameras of the vehicle, instead of the one or more front cameras of the vehicle, for capturing the first camera images before the vehicle is parked at the parking location, when it is determined that the first direction of movement is reverse;
activating the one or more front cameras of the vehicle for capturing the second camera images after the vehicle is parked at the parking location, when it is determined that the second direction of movement is reverse; and
activating the one or more rear cameras of the vehicle, instead of the one or more front cameras of the vehicle, for capturing the second camera images after the vehicle is parked at the parking location, when it is determined that the second direction of movement is forward.

17. The vehicle of claim 14, wherein the processor is further configured to at least facilitate determining a classification as to an intensity, type, and cause of the fluid leak, based on a comparison of color differences of fluid detected between the first camera images and the second camera images along with comparisons of the exposure and white balance between the first camera images and the second camera images with the library of color data pertaining to fluid information for the vehicle.

18. The vehicle of claim 14, wherein the processor is further configured to at least facilitate determining a classification of the fluid leak, based on a comparison of differences in a location with respect to the vehicle fluid detected between the first camera images and the second camera images with a library of location data pertaining to fluid information for the vehicle.

19. The vehicle of claim 14, wherein the processor is further configured to at least facilitate:
generating a report with a classification of the fluid leak based on the comparison between the first camera images and the second camera images; and
providing the report to a user of the vehicle.

* * * * *